United States Patent
Suzuki

(10) Patent No.: US 9,193,288 B2
(45) Date of Patent: Nov. 24, 2015

(54) LUMBAR SUPPORT DEVICE

(71) Applicant: SHIROKI CORPORATION, Fujisawa-shi, Kanagawa (JP)

(72) Inventor: Hiromitsu Suzuki, Fujisawa (JP)

(73) Assignee: SHIROKI CORPORATION, Kanagawa (JP)

( * ) Notice: Subject to any disclaimer, the term of this patent is extended or adjusted under 35 U.S.C. 154(b) by 32 days.

(21) Appl. No.: 14/063,423

(22) Filed: Oct. 25, 2013

(65) Prior Publication Data
US 2014/0125103 A1    May 8, 2014

(30) Foreign Application Priority Data
Nov. 7, 2012    (JP) .................................. 2012-245719

(51) Int. Cl.
*A47C 7/46* (2006.01)
*B60N 2/66* (2006.01)
*B60N 2/02* (2006.01)

(52) U.S. Cl.
CPC ................ *B60N 2/66* (2013.01); *B60N 2/0232* (2013.01); *B60N 2002/0236* (2013.01)

(58) Field of Classification Search
CPC ............ A47C 7/46; A47C 7/462; B60N 2/66; B60N 2/0232
See application file for complete search history.

(56) References Cited

U.S. PATENT DOCUMENTS

| | | | | |
|---|---|---|---|---|
| 4,722,569 A | * | 2/1988 | Morgenstern et al. | 297/284.7 |
| 5,567,010 A | * | 10/1996 | Sparks | 297/284.4 |
| 5,567,011 A | * | 10/1996 | Sessini | 297/284.7 |
| 6,712,427 B1 | | 3/2004 | Bourdkane et al. | |
| 6,820,933 B2 | * | 11/2004 | Fereira Da Silva | 297/284.1 |
| 7,131,694 B1 | * | 11/2006 | Buffa | 297/284.4 |
| 7,909,402 B2 | * | 3/2011 | Chu et al. | 297/284.3 |
| 2005/0184200 A1 | * | 8/2005 | Schwarzbich | 248/56 |
| 2010/0102607 A1 | * | 4/2010 | Mizoi | 297/284.8 |

* cited by examiner

*Primary Examiner* — Philip Gabler
(74) *Attorney, Agent, or Firm* — Cheng Law Group, PLLC

(57) ABSTRACT

A lumbar support device includes: a seat back frame; a warped plate supported by the seat back frame to press a back of a seated person; and a reinforcing plate that reinforces the warped plate, the reinforcing plate being able to curve together with the warped plate. The warped plate includes a holder that holds a first end portion of the reinforcing plate, and a non-interference portion that allows movement of the reinforcing plate relative to the warped plate.

15 Claims, 11 Drawing Sheets

LUMBAR SUPPORT DEVICE

CROSS-REFERENCE TO RELATED APPLICATION

This application claims priority from Japanese Patent Application No. 2012-245719 filed with the Japan Patent Office on Nov. 7, 2012, the entire content of which is hereby incorporated by reference.

BACKGROUND

1. Technical Field

This disclosure relates to a lumbar support device.

2. Related Art

Some seats for a vehicle such as an automobile include a lumbar support device to support the back of a seated person.

Generally, the lumbar support device includes a warped plate. This warped plate presses the back of the seated person for the seated person to keep a correct posture.

The lumbar support device optionally includes a plurality of strip-shaped reinforcing plates. These reinforcing plates play a role in holding the shape of the warped plate. To mount the reinforcing plates on the warped plate, the warped plate includes a plurality of grooves. The respective reinforcing plates are arranged to these grooves. The reinforcing plate has a through hole at a predetermined portion. Meanwhile, the warped plate includes a convex portion at the bottom portion of the groove. The convex portion freely fits the through hole of the reinforcing plate. Accordingly, fitting the through hole and the convex portion inhibits movement of the reinforcing plate along the longitudinal direction of the groove of the warped plate.

Furthermore, the warped plate includes a pressing member to partially cover an opening of the groove. The pressing member serves as preventing the reinforcing plate from leaving from the opening of the groove (see, for example, U.S. Pat. No. 6,712,427).

SUMMARY

A lumbar support device includes: a seat back frame; a warped plate supported by the seat back frame to press a back of a seated person; and a reinforcing plate that reinforces the warped plate, the reinforcing plate being able to curve together with the warped plate. The warped plate includes a holder that holds a first end portion of the reinforcing plate, and a non-interference portion that allows movement of the reinforcing plate relative to the warped plate.

DETAILED DESCRIPTION

Figure 1:
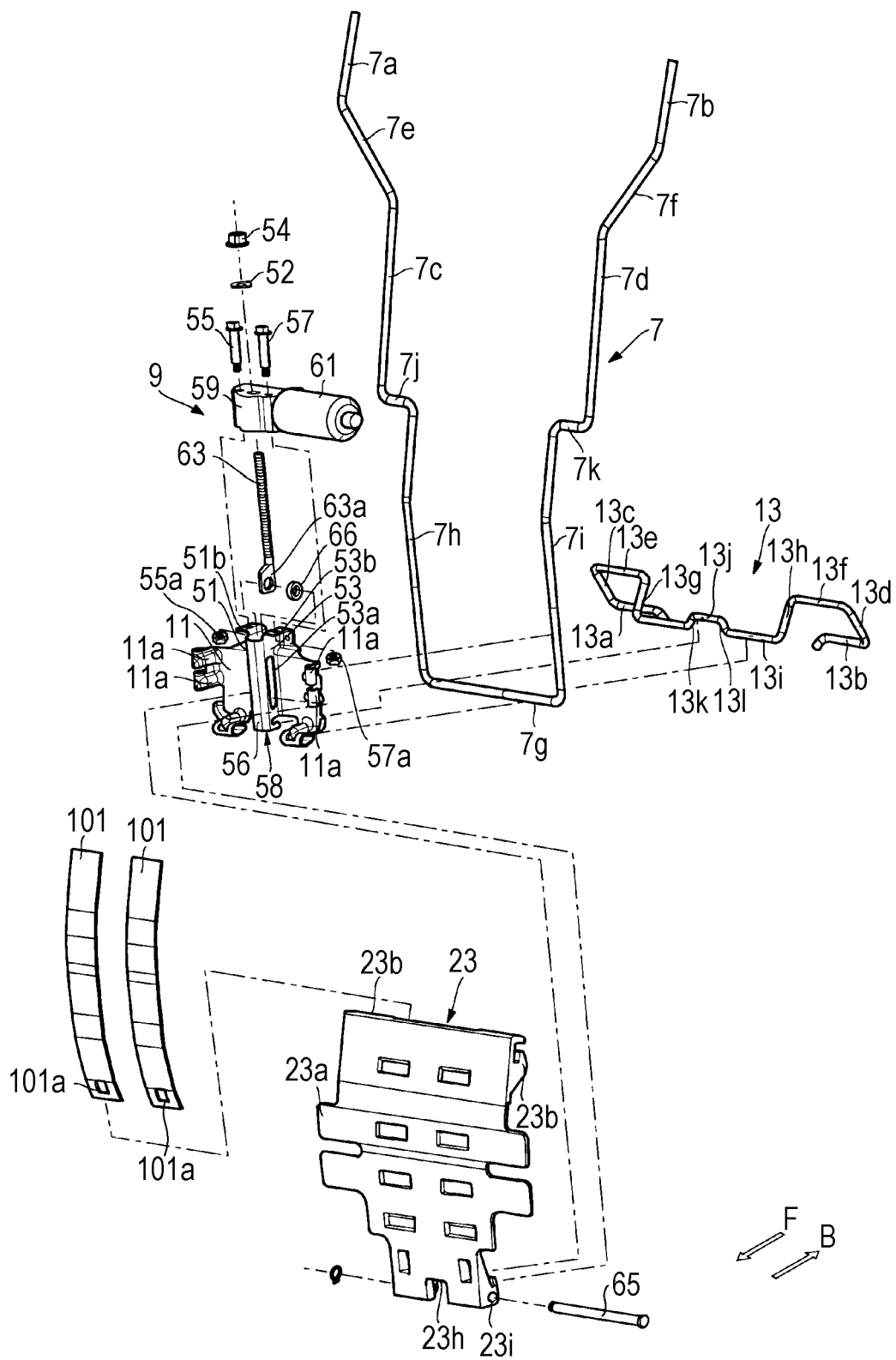
FIG. 1 is an exploded perspective view of a lumbar support device based on one embodiment of this disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the lumbar support device described in U.S. Pat. No. 6,712,427, an elastic modulus of a warped plate differs from an elastic modulus of a reinforcing plate. Accordingly, one curve of the warped plate or the reinforcing plate cannot reliably conform to the other curve. The curve of the reinforcing plate, for example, does not conform to the curve of the warped plate. As a result, the reinforcing plate attempts to move relative to the warped plate. However, fitting of the above-described through hole and convex portion inhibits movement of the reinforcing plate along a groove of the warped plate in the longitudinal direction. Accordingly, the reinforcing plate is compressed toward the longitudinal direction. Then, progression of the compression rapidly deforms the reinforcing plate to the direction of compression being released. Consequently, the deformed reinforcing plate may strongly strike the warped plate to generate sound (knocking sound).

An object of this disclosure is to provide a lumbar support device where a deformed reinforcing plate doses not strongly strike the warped plate nor generate a knocking sound when the warped plate is curved and deformed.

A lumbar support device according to an aspect of this disclosure includes: a seat back frame; a warped plate supported by the seat back frame to press a back of a seated person; and a reinforcing plate that reinforces the warped plate, the reinforcing plate being able to curve together with the warped plate. The warped plate includes a holder that holds a first end portion of the reinforcing plate, and a non-interference portion that allows movement of the reinforcing plate relative to the warped plate.

With the above-described device, the warped plate includes a holder that holds the first end portion of the reinforcing plate. The warped plate includes a non-interference portion allowing the reinforcing plate to move relative to the warped plate. This allows relative movement between the warped plate and the reinforcing plate while being curved. In view of this, the warped plate and the reinforcing plate absorb or release a difference in a degree of curve generated by a difference in the elastic modulus by the relative movement. That is, the warped plate and the reinforcing plate curve conforming to each other.

Accordingly, in this device, when the warped plate is curved and deformed, the reinforcing plate does not strongly strike the warped plate. Accordingly, a knocking sound is not practically generated.

Other configurations and advantageous effects of this disclosure will become more apparent from the following detailed description when taken in conjunction with the accompanying drawings.

Figure 2:
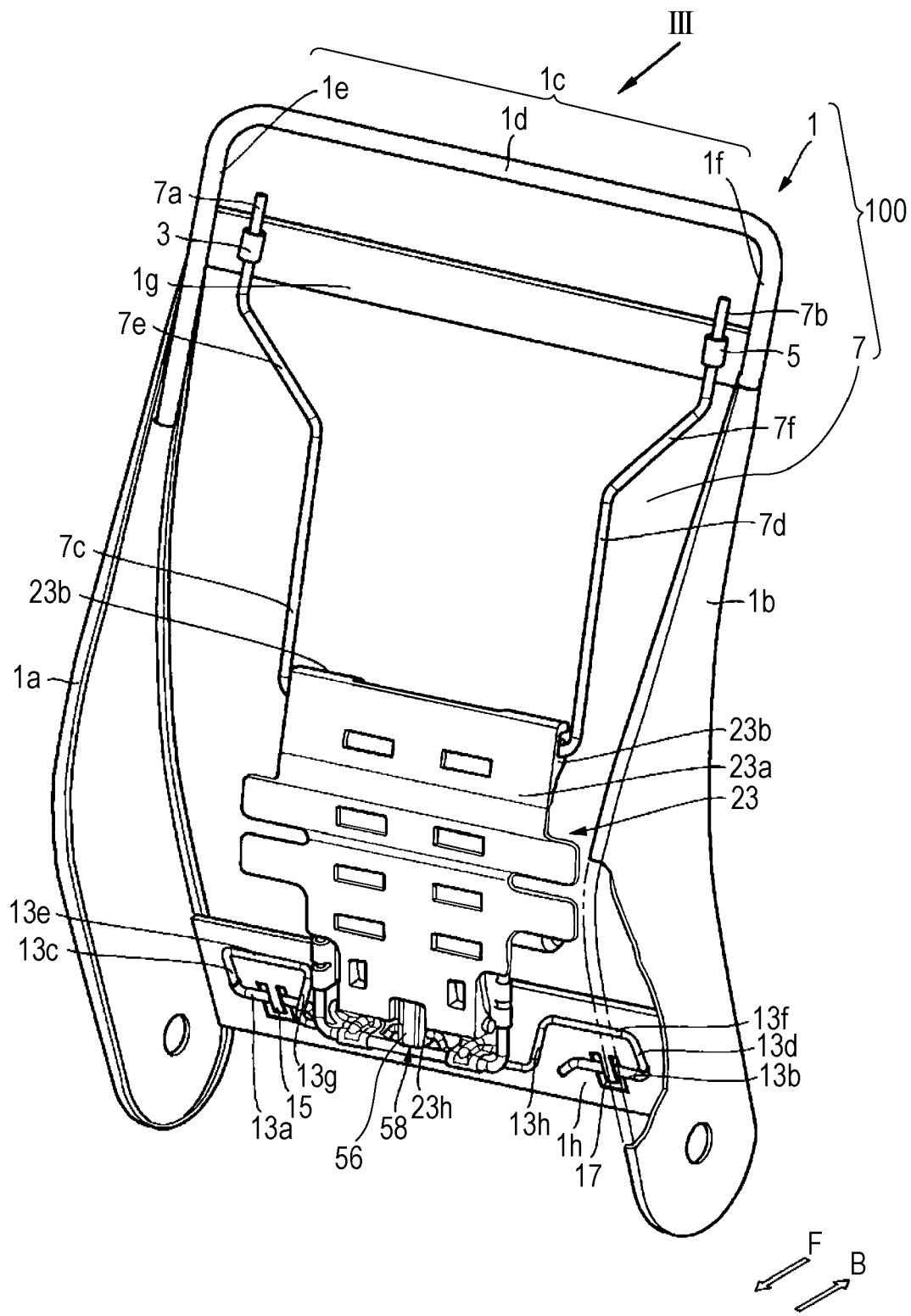
FIG. 2 is a perspective view of the lumbar support device shown in FIG. 1.
Figure 3:
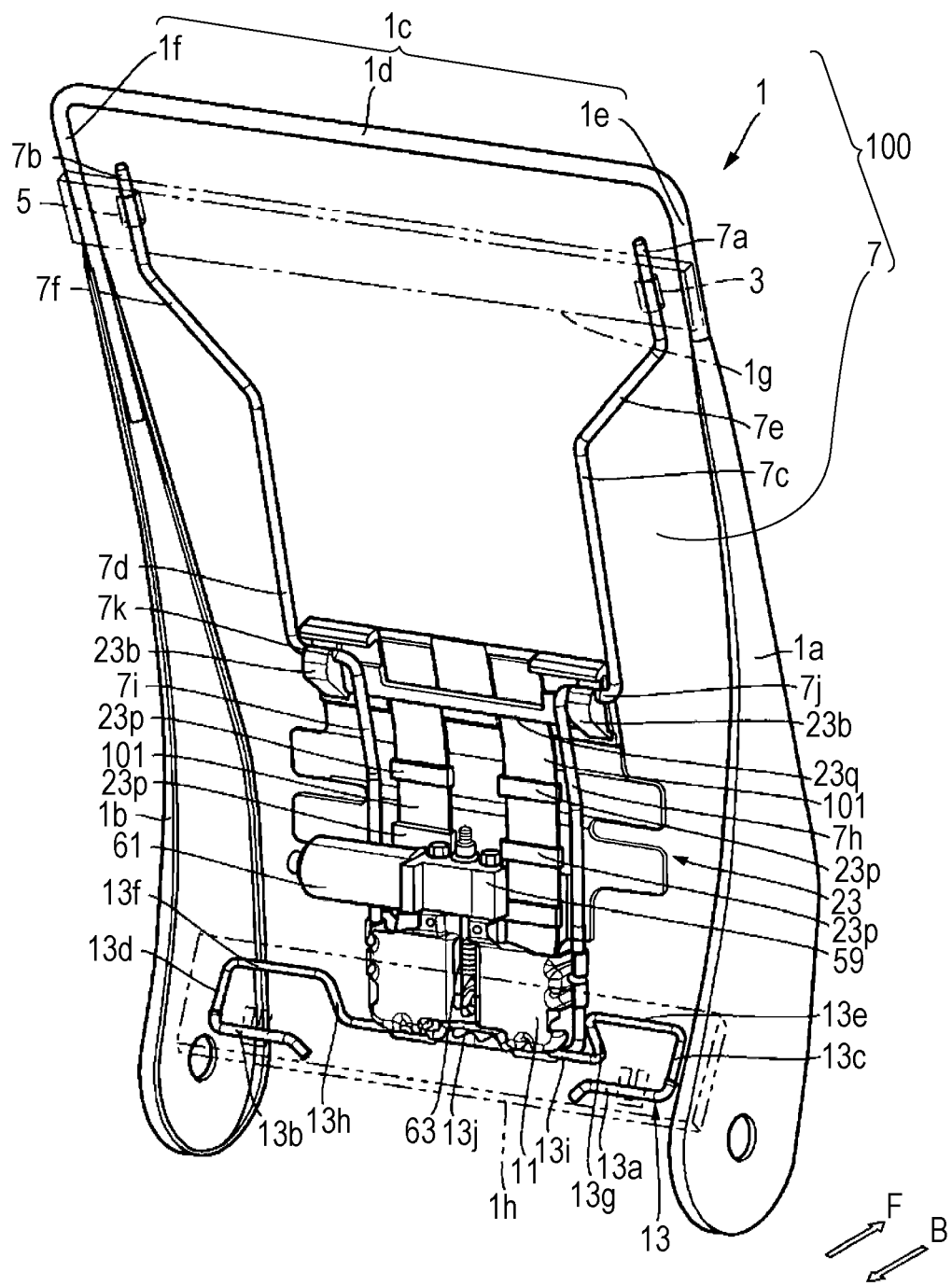
FIG. 3 is a perspective view of the lumbar support device viewed from the arrow III direction in FIG. 2.

The lumbar support device based on one embodiment of this disclosure (this lumbar support device) will be described with reference to the accompanying drawings. First, with FIG. 1 to FIG. 3, the configuration of the lumbar support device will be described. FIG. 1 is an exploded perspective view of the lumbar support device. FIG. 2 is a perspective view of the lumbar support device. FIG. 3 is a perspective view of the lumbar support device viewed from the arrow III direction in FIG. 2.

In FIG. 1 to FIG. 3, the arrow F indicates a front side direction of a seat back where the lumbar support device is disposed (direction of the seat back facing the back of a seated person). The arrow B indicates the back side direction of the seat back. In the following description, the term "front side" is referred to as a "front side of the seat back" facing the back of the seated person. Further, the term "back side" is referred to as a "back side of the seat back" opposite to the "front side of the seat back". Furthermore, the term "vertical direction", "horizontal direction", and "width direction" are respectively referred to as the "vertical direction", the "horizontal direction", and the "width direction" of the seat back.

This lumbar support device firmly holds the back of the seated person to ensure an optimum seating posture of the seated person. The lumbar support device includes a seat back frame 100. The seat back frame 100 will be described by referring to FIG. 1 and FIG. 2. The seat back frame 100 includes a main frame 1 and a big wire 7.

The main frame 1 includes a pair of frames (a right frame 1a and a left frame 1b), an upper frame 1c, a sub-upper frame 1g, and a lower frame 1h. The right frame 1a and the left frame 1b extend in parallel mutually in the longitudinal direction. The upper frame 1c is integrally disposed so as to bridge between the upper end of the right frame 1a and the upper end of the left frame 1b.

Furthermore, the upper frame 1c includes a base portion 1d, a first vertical portion 1e, and a second vertical portion 1f. The base portion 1d extends in the horizontal direction. The first vertical portion 1e is bent from a first end portion of the base portion 1d and coupled to the upper portion of the right frame 1a. The second vertical portion if is bent from a second end portion of the base portion 1d and coupled to the upper portion of the left frame 1b.

The sub-upper frame 1g bridges a middle portion of the first vertical portion 1e and a middle portion of the second vertical portion 1f of the upper frame 1c. The lower frame 1h bridges the lower portion of the right frame 1a and the lower portion of the left frame 1b.

The big wire (the sub frame) 7 is an approximately U-shaped member that supports the back of the seated person together with the main frame 1. That is, the big wire 7 is a spring member with a circular cross-sectional shape, which is bent to an approximately U shape. The approximately U-shaped big wire 7 includes a bridge portion 7g and a pair of extending portions as shown in FIG. 1. The bridge portion 7g corresponds to the bottom portion of the U-shape. Each of the pair of extending portions extends upward from both ends of the bridge portion 7g. Each extending portion includes an upper extending portion 7a (7b) at a free end side, a lower extending portion 7h (7i) at a fixed end side, and a middle extending portion 7c (7d) positioned between the upper extending portion 7a (7b) and the lower extending portion 7h (7i). The pair of extending portions of the big wire 7 is arranged so as to be mutually line symmetry centering a position corresponding to the backbone of the seated person.

In this embodiment, a separation distance between the upper extending portion 7a and the upper extending portion 7b is greater than a separation distance between the middle extending portion 7c and the middle extending portion 7d. Accordingly, an inclined portion 7e (7f) is disposed between the upper extending portion 7a (7b) and the middle extending portion 7c (7d).

A separation distance between the middle extending portion 7c and the middle extending portion 7d is greater than a separation distance between the lower extending portion 7h at the fixed end side and the lower extending portion 7i at the fixed end side. Accordingly, a horizontal portion 7j (7k) is disposed between the middle extending portion 7c (7d) and the lower extending portion 7h (7i).

As shown in FIG. 3, the upper extending portions 7a and 7b of the big wire 7 are respectively inserted through cylindrically-shaped clips 3 and 5. The clips 3 and 5 are mounted to the front side of the sub-upper frame 1g.

A base plate 11 is mounted on the back side at the lower portion of the big wire 7. A driving mechanism 9 is disposed at the base plate 11. Details of the driving mechanism 9 will be described below.

The bridge portion 7g of the big wire 7 is coupled to the lower frame 1h of the seat back frame 100 via a fish mouth spring 13.

The fish mouth spring 13 includes base portions 13a and 13b. On the other hand, the lower frame 1h of the seat back frame 100 includes two clasps (cut-and-raised pieces) 15 and 17. Accordingly, the base portions 13a and 13b of the fish mouth spring 13 are respectively fitted to the clasps 15 and 17, thus securing the fish mouth spring 13 to the lower frame 1h. The clasps 15 and 17 are formed by cutting and raising a part of the lower frame 1h. A distance between the clasp 15 and the clasp 17 is wider than a distance between the lower extending portion 7h and the lower extending portion 7i of the big wire 7.

The fish mouth spring 13 includes rising portions 13c and 13d, base portion-opposed portions 13e and 13f, torsion arm portions 13g and 13h, and a mounting portion 13i. The rising portions 13c and 13d extend upward from the respective end portions of the base portions 13a and 13b (the right frame 1a and the left frame 1b sides of the seat back frame 100). The base portion-opposed portions 13e and 13f bend from the distal end portion of the rising portions 13c and 13d and extend toward the respective lower extending portions 7h and 7i of the big wire 7.

Each of the torsion arm portions 13g and 13h bends from the distal end portion of the base portion-opposed portions 13e and 13f and extends toward the bridge portion 7g of the big wire 7. The mounting portion 13i bridges the distal end portion of the torsion arm portion 13g and the distal end portion of the torsion arm portion 13h, and extends along the bridge portion 7g of the big wire 7. Furthermore, the mounting portion 13i includes arm portions 13k and 13l and a step portion 13j at the center. The arm portions 13k and 13l intersect an extending direction of the mounting portion 13i. The step portion 13j bridges the distal end portion of the arm portion 13k and the distal end portion of the arm portion 13l.

That is, in the fish mouth spring 13, the base portions 13a and 13b, the rising portions 13c and 13d, and the base portion-opposed portions 13e and 13f serve as a base end portion where the torsion arm portions 13g and 13h are secured. The mounting portion 13*i* of the fish mouth spring 13 corresponds to the distal end portions of the torsion arm portions 13*g* and 13*h*.

Figure 9:
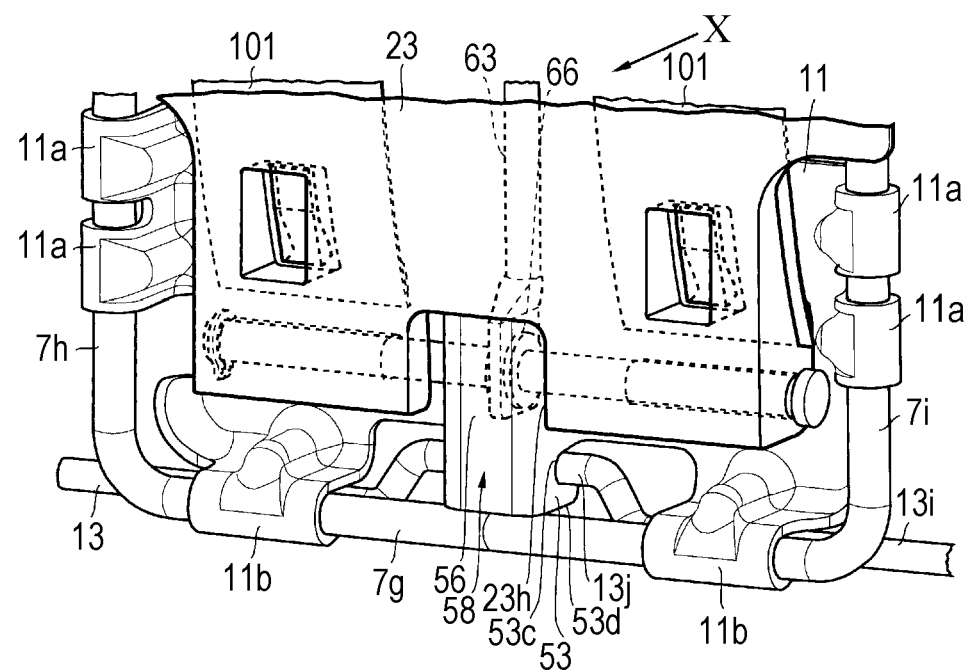
FIG. 9 is a perspective view illustrating installation of a base plate, a fish mouth spring, and a big wire disposed at the lumbar support device in FIG. 1.
Figure 10:
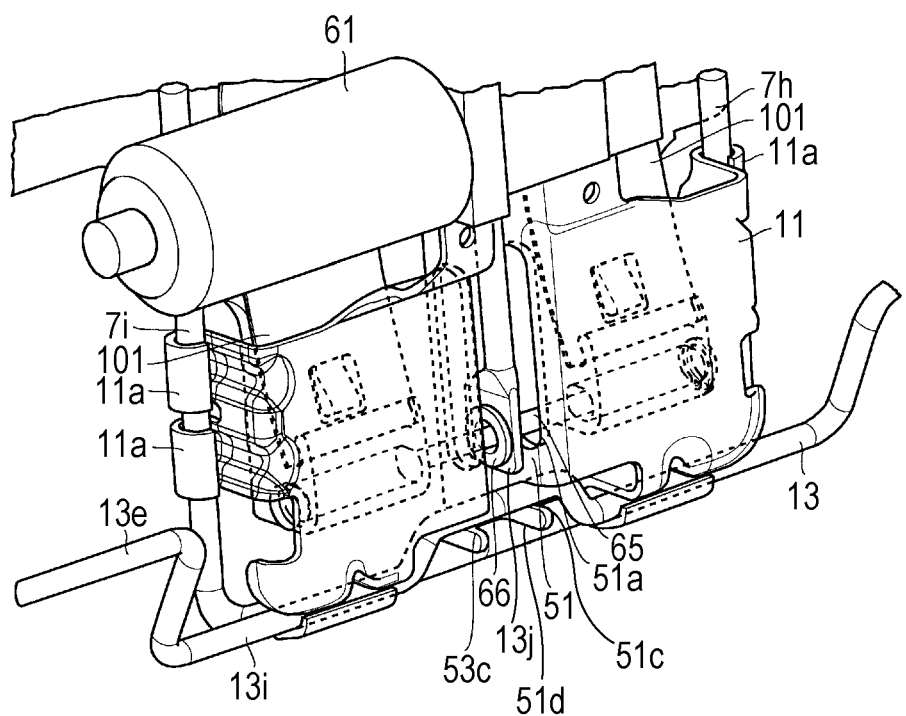
FIG. 10 is a perspective view viewed from the arrow X direction in FIG. 9.

Next, installation of the base plate 11, the big wire 7, and the fish mouth spring 13 will be described by referring to FIG. 9 and FIG. 10. FIG. 9 is a perspective view illustrating installation of the base plate 11, the fish mouth spring 13, and the big wire 7 shown in FIG. 1. FIG. 10 is a perspective view viewed from the arrow X direction in FIG. 9.

First, installation of the base plate 11 to the big wire 7 will be described. The base plate 11 includes two side crimp portions 11*a* at each end portion in the longitudinal direction. These side crimp portions 11*a* extend in the horizontal direction. The four side crimp portions 11*a* are each crimped to wrap around onto the lower extending portions 7*h* and 7*i* of the big wire 7. This mounts the base plate 11 to the lower extending portions 7*h* and 7*i* of the big wire 7.

Next, installation of the base plate 11 and the fish mouth spring 13 to the big wire 7 will be described. The base plate 11 includes two lower crimp portions 11*b* extending downward at the lower portion. The lower crimp portion 11*b* is crimped to wrap around onto the bridge portion 7*g* of the big wire 7 and the mounting portion 13*i* of the fish mouth spring 13. This mounts the base plate 11 and the mounting portion 13*i* of the fish mouth spring 13 to the bridge portion 7*g* of the big wire 7.

A warped plate 23 is disposed at the front side of the lower extending portions 7*h* and 7*i* of the big wire 7. The warped plate 23 is an approximately plate-shaped member made of the resin. A degree of curve of the warped plate 23 can be changed with the driving mechanism 9.

Figure 11:
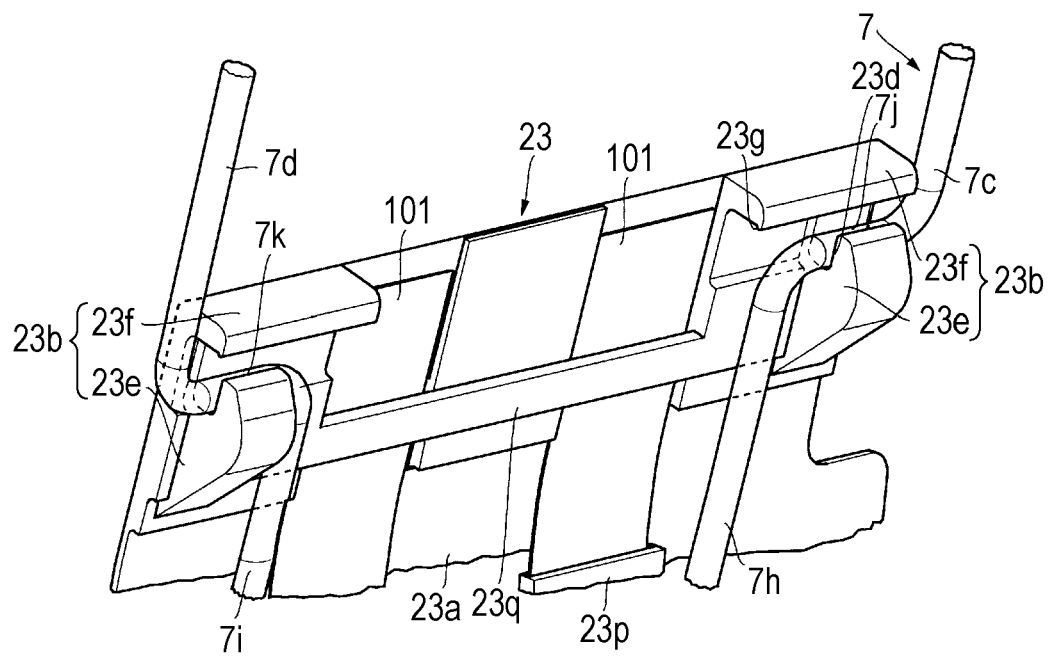
FIG. 11 is a perspective view illustrating installation of the warped plate and the big wire in the lumbar support device in FIG. 1.

Next, using FIG. 11, installation of the upper portion of the warped plate 23 and the big wire 7 will be described. FIG. 11 is a perspective view illustrating installation of the warped plate and the big wire shown in FIG. 1. At the upper portion of a plate main body 23*a*, which is a curved portion of the warped plate 23, a hinge portion 23*b* is integrally formed. The hinge portions 23*b* are rotatably engaged to the horizontal portions 7*j* and 7*k* of the big wire 7.

The hinge portion 23*b* includes a hinge main body portion 23*e* and a cantilever (approximately L shape) retaining portion 23*f*. The hinge main body portion 23*e* includes a groove 23*d* extending in the width direction of the seat back. The horizontal portion 7*j* (7*k*) of the big wire 7 fits the groove 23*d*. The retaining portion 23*f* is elastic. The retaining portion 23*f* has a portion projecting horizontally from the plate main body 23*a*. The lower surface of the projecting portion faces an opening of the groove 23*d*.

In this embodiment, a distance between the surface of the retaining portion 23*f* facing the hinge main body portion 23*e* and the opening of the groove 23*d* of the hinge main body portion 23*e* is equal to or more than a diameter of the big wire 7 (thickness in the vertical direction). Furthermore, the retaining portion 23*f* includes a convex portion 23*g* at the distal end portion (end of the lower surface). This convex portion 23*g* projects toward the hinge main body portion 23*e*. A distance between the distal end of the convex portion 23*g* and the hinge main body portion 23*e* is set so as to be less than the diameter of the big wire 7 (thickness in the vertical direction).

The horizontal portion 7*j* (7*k*) of the big wire 7 is mounted to the hinge portion 23*b* of the warped plate 23 as follows. That is, the horizontal portion 7*j* (7*k*) of the big wire 7 is pressed to the distal end portion of the retaining portion 23*f* of the hinge portion 23*b*. This bends the distal end of the retaining portion 23*f* upward. Accordingly, the distance of the convex portion 23*g* and the hinge main body portion 23*e* becomes equal to or more than the diameter of the big wire 7.

This allows insertion from the outside of the horizontal portion 7*j* (7*k*) of the big wire 7 to the groove 23*d*. In a natural state, the distance between the convex portion 23*g* of the retaining portion 23*f* and the hinge main body portion 23*e* is less than the diameter of the big wire 7 (thickness in the vertical direction). Accordingly, the horizontal portion 7*j* (7*k*) of the big wire 7 is inhibited from leaving from the groove 23*d* to the outside.

Figure 4:
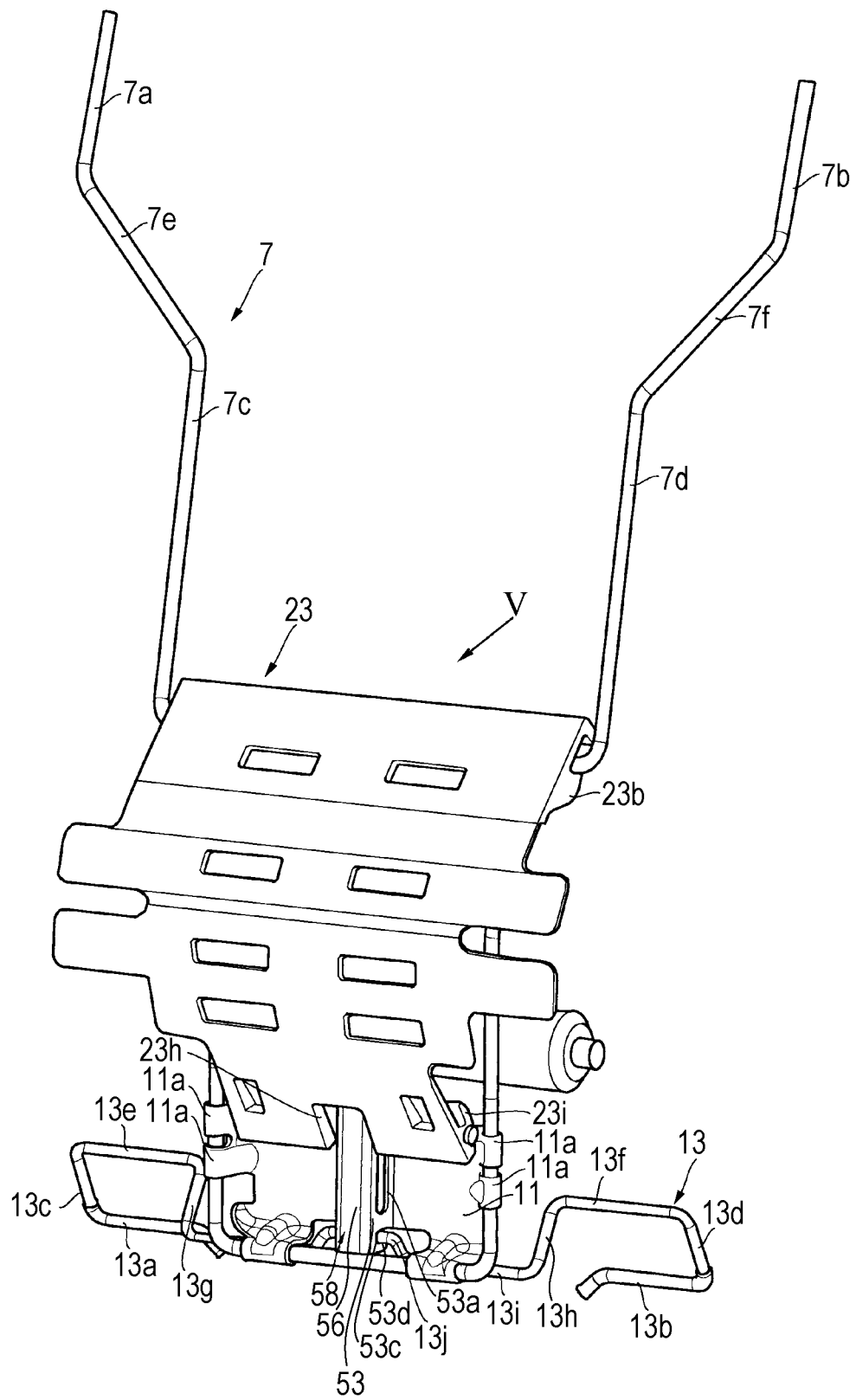
FIG. 4 is a perspective view of the lumbar support device in FIG. 1 illustrating a state of a warped plate being deformed to a direction of pressing a back of a seated person.
Figure 5:
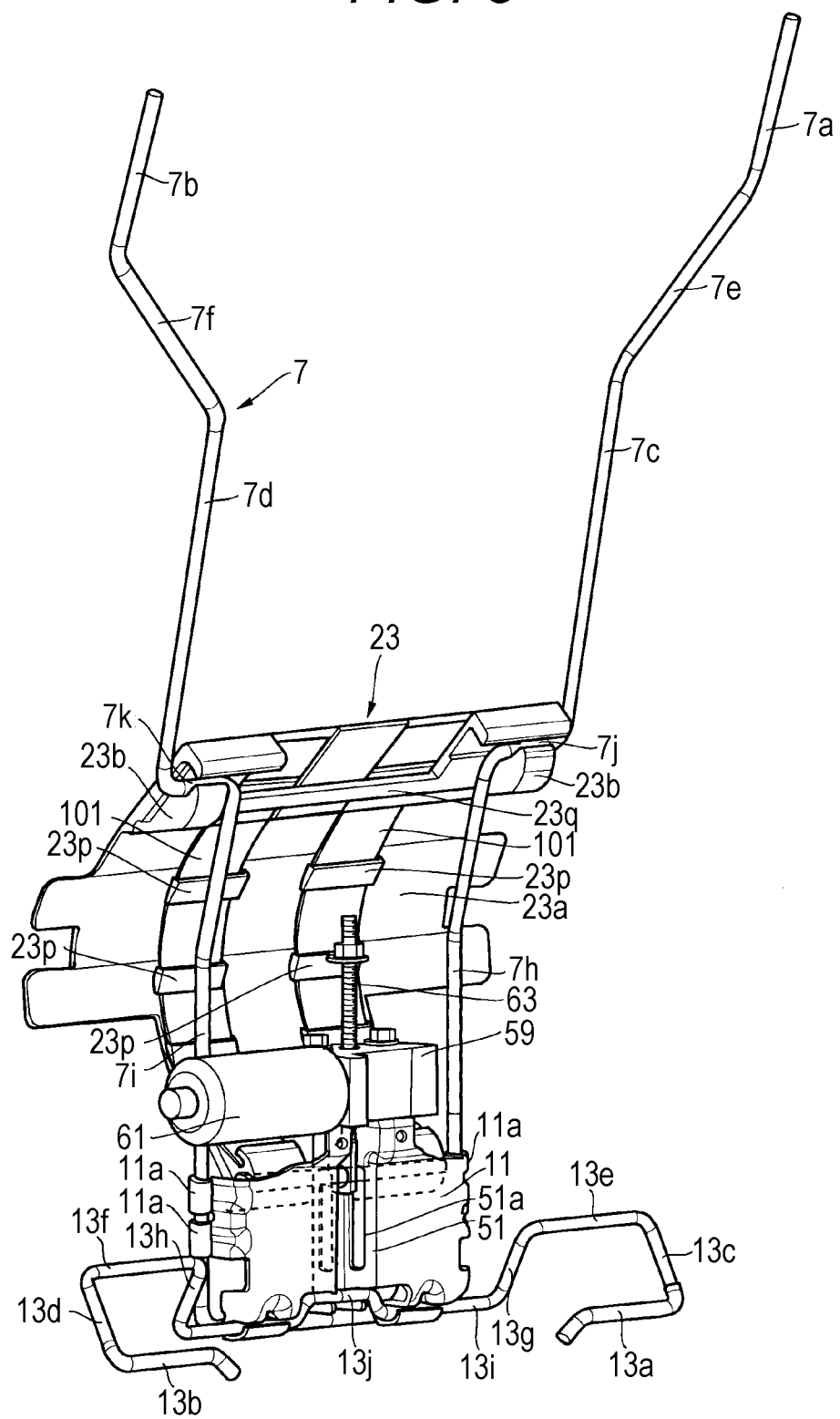
FIG. 5 is a perspective view of the lumbar support device viewed from the arrow V direction in FIG. 4.
Figure 7:
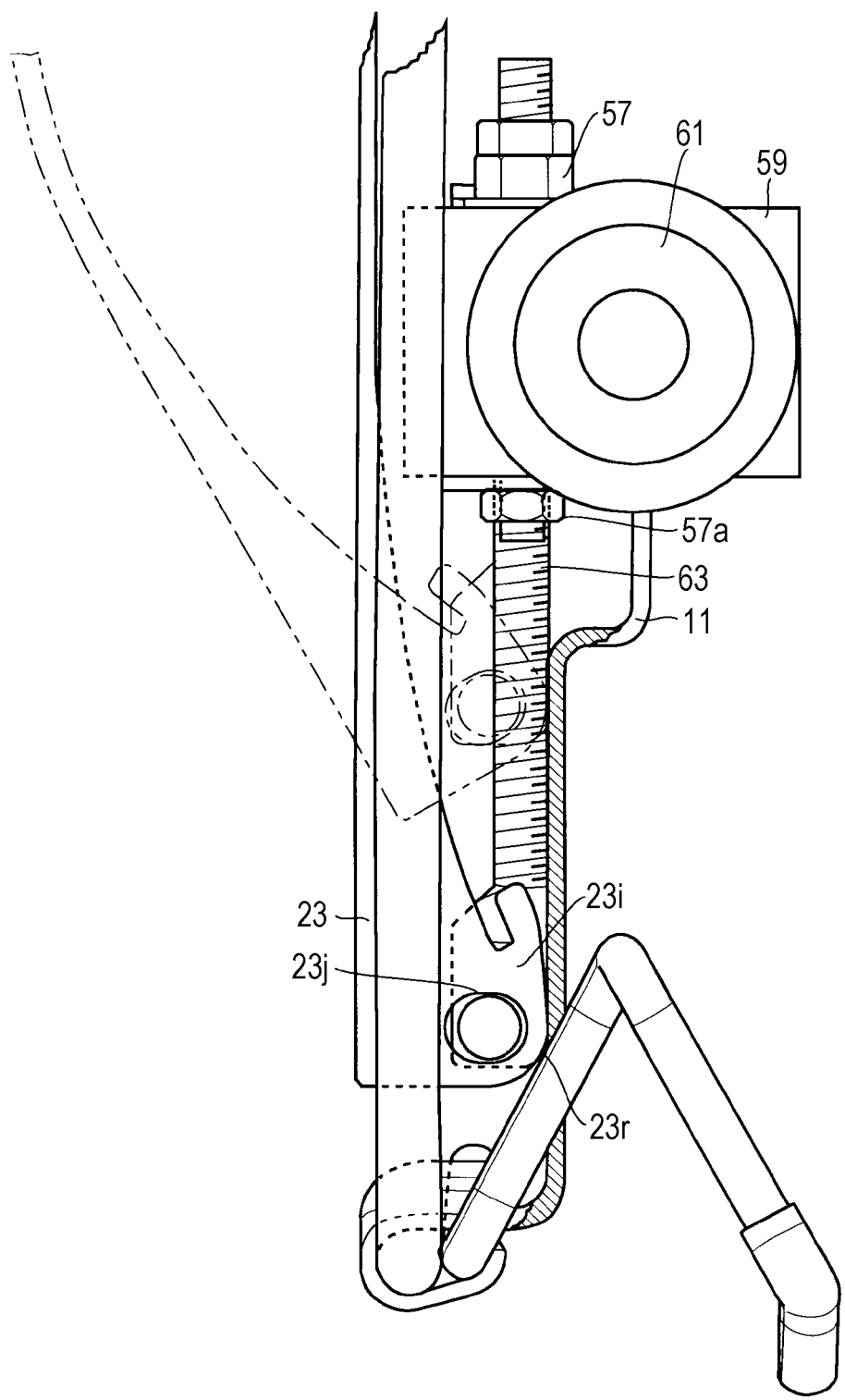
FIG. 7 is a schematic view illustrating an actuation of a driving mechanism disposed at the lumbar support device in FIG. 1.

Next, using FIG. 1 to FIG. 5, FIG. 7, and FIG. 9 and FIG. 10, the schematic configuration of the driving mechanism 9 will be described. FIG. 4 is a perspective view of the lumbar support device illustrating a state of the warped plate being deformed to the direction of pressing the back of the seated person. FIG. 5 is a perspective view of the lumbar support device viewed from the arrow V direction in FIG. 4. FIG. 7 is a schematic view illustrating an actuation of the driving mechanism 9.

As already described, the base plate 11 is mounted to the back side at the lower portion of the big wire 7. The base plate 11 includes a first upstanding wall portion 51, a second upstanding wall portion 53, and a bridge portion 56 at the center portion on the front side. The first upstanding wall portion 51 extends in the vertical direction. The second upstanding wall portion 53 is parallel to the first upstanding wall portion 51. The bridge portion 56 bridges the first upstanding wall portion 51 and the second upstanding wall portion 53. The first upstanding wall portion 51 has a first guide hole 51*a* extending in the vertical direction. Similarly, the second upstanding wall portion 53 has a second guide hole 53*a* extending in the vertical direction (see FIG. 5). The first guide hole 51*a* is opposed to the second guide hole 53*a*.

The lower end surface of the first upstanding wall portion 51 and the lower end surface of the second upstanding wall portion 53 include a respective contacting portion 51*d* and a contacting portion 53*d* in contact with the bridge portion 7*g* of the big wire 7.

The first upstanding wall portion 51 and the second upstanding wall portion 53 respectively include a first depressed portion 51*c* and a second depressed portion 53*c* at the lower portions. The step portion 13*j* of the fish mouth spring 13 is engaged to the first depressed portion 51*c* and the second depressed portion 53*c*. This configuration inhibits the fish mouth spring 13 from rotating about the mounting portion 13*i* and the base portion-opposed portions 13*e* and 13*f* (base end portions) of the fish mouth spring 13 as an axis.

The upper portion of the first upstanding wall portion 51 is bent toward the right frame 1*a* direction of the main frame 1. This bend portion includes a first gear box mounting portion 51*b*. On the other hand, the upper portion of the second upstanding wall portion 53 is bent toward the left frame 1*b* direction of the main frame 1. The bend portion includes a second gear box mounting portion 53*b*.

As shown in FIG. 1, a gear box 59 is mounted to both the first gear box mounting portion 51*b* and the second gear box mounting portion 53*b* with tightening threads 55 and 57. The gear box 59 incorporates a nut member (not shown). A motor 61 is integrally mounted to the gear box 59. The nut member is a female thread and rotates in conjunction with the rotation of the shaft of the motor 61.

A thread bar 63 is a male thread with a ridge at the outer peripheral surface. The thread bar 63 includes a hole 63*a* at one end. The hole 63*a* opens to the direction orthogonal to the thread bar 63. A rod (pin: mounting member) 65 is inserted into the hole 63*a*. In this embodiment, the hole 63*a* has an inner diameter set larger than the outer diameter of the rod 65. Between the hole 63*a* and the rod 65, an elastic bush 66 is press-fitted.

The thread bar 63 is screwed with the nut member and projects from the gear box 59 in the vertical direction. The thread bar 63 is positioned at the space between the first upstanding wall portion 51 and the second upstanding wall portion 53. As shown in FIG. 1, a washer 52 is fitted to and a stopper nut 54 is screwed with the portion of the thread bar 63 outside of the gear box 59.

The base plate 11 includes a convex portion 58 at the center lower portion. The convex portion 58 can support the pelvis of the seated person. This convex portion 58 includes the first upstanding wall portion 51, the second upstanding wall portion 53, and the bridge portion 56. The convex portion 58 projects to the front surface side of the seat back.

The lower portion of the warped plate 23 is formed such that the cross-sectional shape in the front and back direction is bent to an approximately U shape. The lower portion includes a cutout 23h and a pair of mounting portions 23i at both sides of the cutout 23h. The pair of mounting portions 23i extends approximately parallel to one another. The cutout 23h is formed by cutting out the center lower portion. Accordingly, the cutout 23h prevents the convex portion 58 of the base plate 11 and the lower portion of the warped plate 23 from interfering with one another.

The mounting portions 23i each include the hole 23j. These holes 23j face one another along the width direction of the warped plate 23. In this embodiment, the holes 23j each have a cross-sectional shape of an elongated hole. This allows the rod 65 to be freely fitted to these holes 23j. That is, the rod 65 is inserted through the hole 63a of the thread bar 63. This rod 65 passes through the first guide hole 51a of the first upstanding wall portion 51 and the second guide hole 53a of the second upstanding wall portion 53 of the convex portion 58, and freely fits the hole 23j of the mounting portion 23i of the warped plate 23. The rod 65 passes through the hole 63a of the thread bar 63. That is, coupling the base plate 11 and the lower portion of the warped plate 23 with a hinge via the rod 65 supports the lower portion of the warped plate 23 at the one end of the thread bar 63.

In view of this, the thread bar 63 can move along the axis direction of itself (movement along the first guide hole 51a and the second guide hole 53a) while rotation around the axis direction of itself is inhibited. That is, driving the motor 61 rotates the nut member (not shown) in the gear box 59. The thread bar 63 threaded to the nut member moves along the first guide hole 51a and the second guide hole 53a. Additionally, the lower portion of the warped plate 23 moves in the vertical direction along the first guide hole Ma and the second guide hole 53a.

As described above, the driving mechanism 9 includes the gear box 59, the motor 61, the thread bar 63, the rod 65, the second guide hole 53a, and the first guide hole 51a. That is, as already described, the gear box 59 includes the nut member. The nut member is rotated by the motor 61. The nut member is threaded with the thread bar 63. The rod 65 couples the thread bar 63 and the lower portion of the warped plate 23. The rod 65 is inserted through the second guide hole 53a of the second upstanding wall portion 53 and the first guide hole 51a of the first upstanding wall portion 51.

Figure 6:
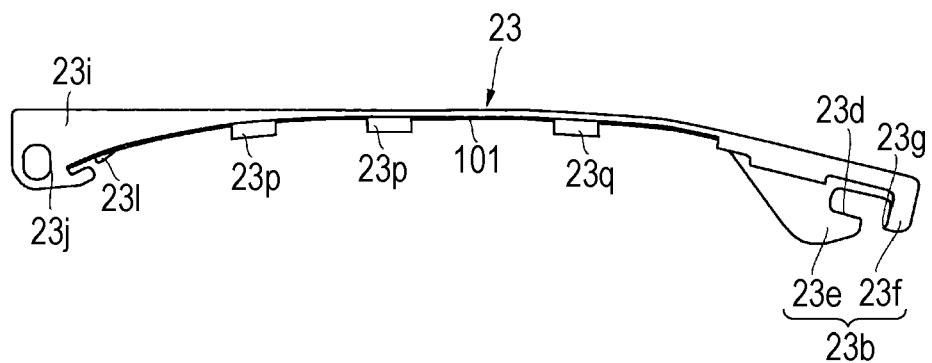
FIG. 6 is a side view of the warped plate disposed in the lumbar support device in FIG. 1.
Figure 8:
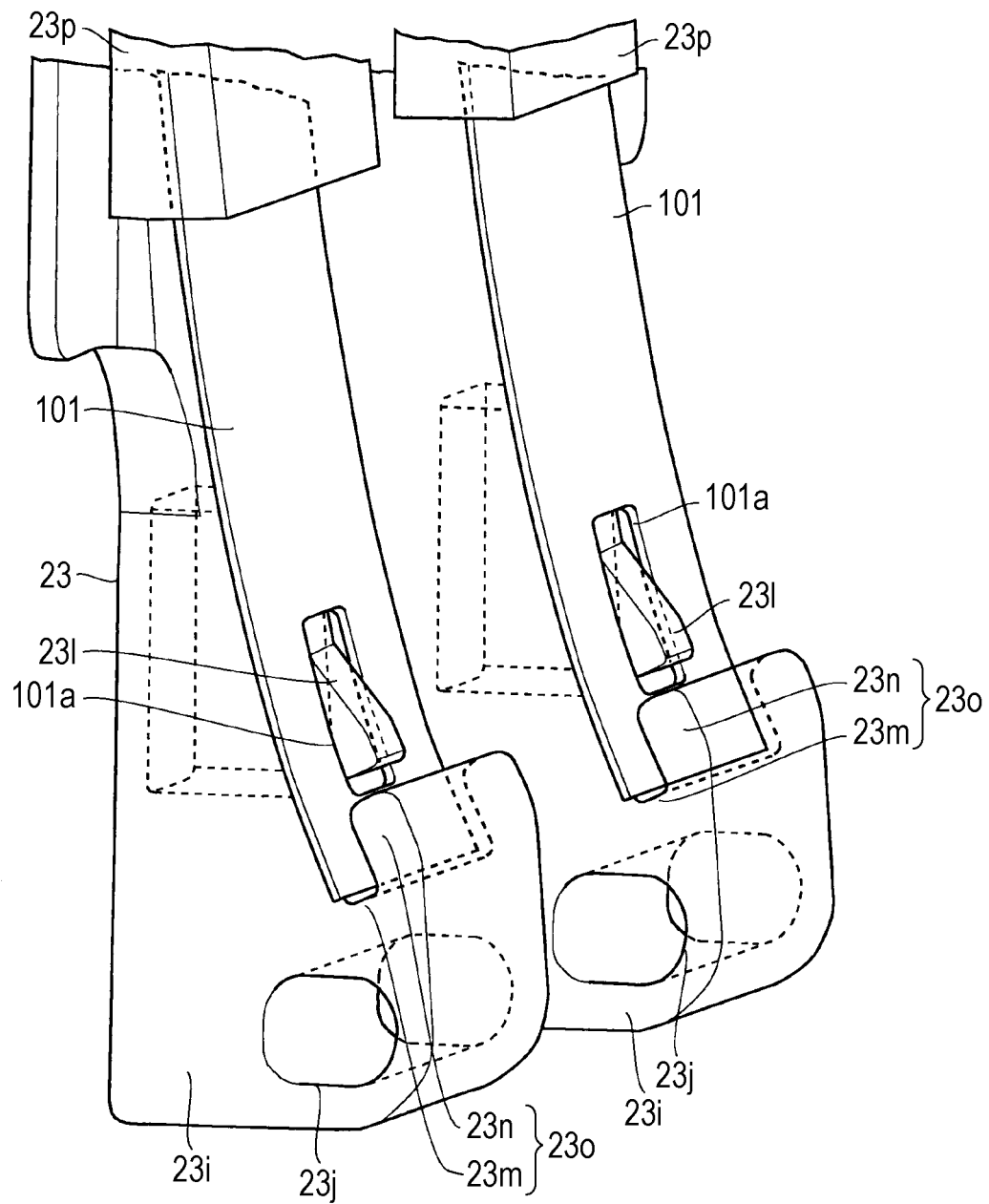
FIG. 8 is a schematic view illustrating how the warped plate and the reinforcing plate disposed at the lumbar support device in FIG. 1 are held.

Next, the reinforcing plate will be described by referring to FIG. 1, FIG. 3, FIG. 5, FIG. 6, FIG. 8, and FIG. 11. FIG. 6 is a side view of the warped plate in FIG. 1. FIG. 8 is a schematic view illustrating how the warped plate and the reinforcing plate in FIG. 1 are held.

The warped plate 23 includes two reinforcing plates 101 at the back surface. The reinforcing plates 101 have a strip shape and extend in the vertical direction. The reinforcing plate 101 has a rectangular hole 101a at the lower portion. Meanwhile, the warped plate 23 includes a convex portion 23l and a holding convex portion 23o at the lower portion. The convex portion 23l of the warped plate 23 fits the hole 101a of the reinforcing plate 101. The holding convex portion 23o includes a base portion 23m and a bend portion 23n. The base portion 23m is opposed to the lower end surface of the reinforcing plate 101. The bend portion 23n is bent from the distal end portion of the base portion 23m and opposed to the upper surface at the lower portion of the reinforcing plate 101.

The holding convex portion 23o constitutes a holder together with the convex portion 23l, which engages the hole 101a of the reinforcing plate 101. The holder holds the lower portion of the reinforcing plate 101 (first end portion) to the warped plate 23.

Further, as shown in FIG. 5 and FIG. 6, the warped plate 23 includes a plurality of guides 23p and one guide 23q at the back surface. The guide 23q extends in the width direction of the two reinforcing plates 101. The guide 23q is disposed so as to maintain a space (gap) between the two reinforcing plates 101 and extends across the two reinforcing plates 101.

In this embodiment, as shown in the drawing, the two guides 23p are disposed for the one reinforcing plate 101. These guides 23p are also disposed so as to provide a space (gap) with the two reinforcing plates 101 and extend across the two reinforcing plates 101.

Accordingly, the reinforcing plate 101 is freely supported by the guides 23p and 23q. Thus, the guides 23p and 23q function as a non-interference portion that allows the reinforcing plate 101 to move in the vertical direction relative to the warped plate 23. The numbers of the guides 23p and 23q are not limited to the number of the guides of the embodiment.

Next, an operation of the lumbar support device will be described by referring to FIG. 2 to FIG. 5 and FIG. 7.

The lumbar support device assumes a plurality of states. That is, a first state is as shown in FIG. 2 and FIG. 3. In this state, the thread bar 63 is positioned below and a degree of curve of the warped plate 23 is small. Accordingly, the warped plate 23 is not deformed so much in the direction that presses the back of the seated person.

In a second state, the warped plate 23 presses the back of the seated person. That is, the motor 61 is rotated and driven from the first state to one direction. Driving of the motor 61 rotates the nut member in the gear box 59 to one direction. The rotation of the nut member raises the thread bar 63 as shown in FIG. 7. Then, as shown in FIG. 4 and FIG. 5, the lower portion of the warped plate 23 is raised. On the other hand, the upper portion of the warped plate 23 is inhibited to be raised or descended with the hinge portion 23b. Consequently, the warped plate 23 is significantly curved, pressing the back of the seated person.

In a third state, pressing force of the warped plate 23 to the back of the seated person is reduced. That is, from the states shown in FIG. 4 and FIG. 5, the motor 61 is reversely rotated and driven. The driving of the motor 61 reversely rotates the nut member in the gear box 59. Accordingly, the thread bar 63 is descended, decreasing the degree of curve of the warped plate 23. As a result, a deformation amount of the warped plate 23 to the direction that presses the back of the seated person is reduced.

When the warped plate 23 is curved, a part of the warped plate 23 (the mounting portion 23i) is in sliding contact with the base plate 11. In this embodiment, as shown in FIG. 7, a sliding contact surface 23r of the mounting portion 23i in the warped plate 23 has an arc surface.

The convex portion 58 of the base plate 11 in the embodiment functions as a pelvis supporting portion that supports the pelvis of the seated person when the lower portion of the warped plate 23 is raised.

The above-described configuration ensures the following advantageous effects.

As described above, the warped plate 23 includes the convex portion 23*l* and the holder. The convex portion 23*l* engages the hole 101*a* of the reinforcing plate 101. The holder is constituted by the holding convex portion 23*o*. The warped plate 23 includes a non-interference portion including the two guides 23*p* and the one guide 23*q*. This non-interference portion allows the reinforcing plate 101 to move in the vertical direction relative to the warped plate 23. Accordingly, the warped plate 23 and the reinforcing plate 101 can move relatively while being curved. In view of this, the warped plate 23 and the reinforcing plate 101 absorb or release a difference in the degree of curves generated by a difference in the elastic modulus by the relative movement. That is, the warped plate 23 and the reinforcing plate 101 curve conforming to each other.

Therefore, when the warped plate 23 is curved and deformed, the reinforcing plate 101 does not strongly strike the warped plate 23. In view of this, a knocking sound is not practically generated.

This disclosure is not limited to the above-described embodiment. In the above-described embodiment, the upper portion of the warped plate 23 is rotatably supported by the big wire 7 of the seat back frame 100. Furthermore, the lower portion of the warped plate 23 is movable in the vertical direction. This allows the warped plate 23 to be deformed in the direction that presses the back of the seated person. However, the lower portion of the warped plate 23 may be rotatably supported to the seat back frame 100 and the upper portion of the warped plate 23 may move in the vertical direction. The warped plate 23 with this configuration is also deformable to the direction that presses the back of the seated person.

In the above-described embodiment, the motor 61 is used as the driving mechanism 9. However, the driving mechanism 9 may be configured to change the degree of curve of the warped plate 23 by a human force.

The lumbar support device according to the embodiment may be the following first lumbar support device. The first lumbar support device includes: a seat back frame disposed at a seat back to support a back of a seated person; a warped plate supported by the seat back frame; a driving mechanism configured to change a degree of curve of the warped plate; and a reinforcing plate disposed along the warped plate and curved together with the warped plate. The warped plate includes a holder and a non-interference portion. The holder holds a one end portion (first end portion) of the reinforcing plate. The non-interference portion allows movement of the other end portion (second end portion) of the reinforcing plate relative to the warped plate.

With the first lumbar support device, the warped plate includes the holder that holds the one end portion of the reinforcing plate and the non-interference portion that allows movement of the other end portion side of the reinforcing plate relative to the warped plate. Accordingly, the warped plate and the reinforcing plate can move relatively while being curved. That is, the warped plate and the reinforcing plate curve conforming to each other while absorbing a difference in an elastic modulus by the relative movement. Therefore, when the warped plate is curved and deformed, a knocking sound is not generated.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lumbar support device, comprising:
   a seat back frame;
   a warped plate supported by the seat back frame to press a back of a seated person; and
   a reinforcing plate that reinforces the warped plate, the reinforcing plate being able to curve together with the warped plate, wherein
   the warped plate includes a holder that holds a first end portion of the reinforcing plate, and a plurality of non-interference portions that allow movement of the reinforcing plate relative to the warped plate,
   the holder holds the first end portion of the reinforcing plate to allow the movement relative to the warped plate to be controlled,
   the non-interference portions allow movement of a second end portion of the reinforcing plate in a vertical direction of a seat back relative to the warped plate and support a part of the reinforcing plate to be freely movable, and
   the non-interference portions are separately arranged with a space therebetween in which the reinforcing plate is exposed.

2. The lumbar support device according to claim 1, further comprising
   a driving mechanism configured to change a degree of curve of the warped plate.

3. The lumbar support device according to claim 2, wherein
   the driving mechanism includes a motor and a thread bar configured to move in a vertical direction by the motor, and
   the warped plate includes a lower portion supported to one end portion of the thread bar.

4. The lumbar support device according to claim 3, wherein
   a base plate is disposed at a lower portion of the seat back frame, and
   the driving mechanism is disposed at the base plate.

5. The lumbar support device according to claim 4, wherein
   the thread bar includes one end portion hinged to the lower portion of the warped plate via a rod.

6. The lumbar support device according to claim 5, wherein
   the warped plate is in partial sliding contact with the base plate when the warped plate curves.

7. The lumbar support device according to claim 1, wherein
   each non-interference portion includes a guide disposed at the warped plate, and
   the reinforcing plate is supported by the guides to be freely movable.

8. The lumbar support device according to claim 7, comprising a plurality of the guides disposed to extend in a width direction of the reinforcing plate to maintain a space with the reinforcing plate.

9. The lumbar support device according to claim 1, wherein
   the warped plate includes an upper portion rotatably supported to the seat back frame, and the warped plate includes a lower portion that is movable in a vertical direction.

10. The lumbar support device according to claim 1, wherein
the warped plate includes a lower portion rotatably supported to the seat back frame, and
the warped plate includes an upper portion that is movable in a vertical direction.

11. The lumbar support device according to claim 1, comprising a space between the holder and the non-interference portions.

12. The lumbar support device according to claim 1, wherein
the holder includes a convex portion engaging a hole of the reinforcing plate, a base portion opposed to the first end portion of the reinforcing plate, and a bend portion bent from a distal end portion of the base portion.

13. The lumbar support device according to claim 1, wherein
the holder includes a convex portion engaging a hole of the reinforcing plate,
the convex portion is provided with an inclined surface on an upper surface of the convex portion, and
the inclined surface is formed in such a manner that a height of the inclined surface decreases in a direction front the first end portion of the reinforcing plate toward the second end portion of the reinforcing plate.

14. The lumbar support device according to claim 13, wherein the holder includes a base portion opposed to the first end portion of the reinforcing plate.

15. The lumbar support device according to claim 13, wherein the hole of the reinforcing plate has a rectangular shape.

\* \* \* \* \*